Figure 1:
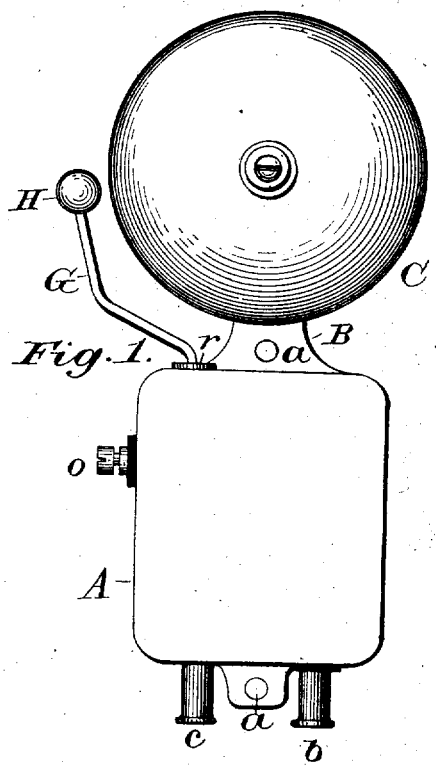

E. W. HAZAZER.

ELECTRIC BELL.

No. 10,533. Reissued Oct. 21, 1884.

Witnesses:
Paul D. Dyer
T. G. Greene Jr.

Inventor:
Edgar W. Hazazer
By Dyer & Greene
Attys

UNITED STATES PATENT OFFICE.

EDGAR W. HAZAZER, OF NEW YORK, N. Y.

ELECTRIC BELL.

SPECIFICATION forming part of Reissued Letters Patent No. 10,533, dated October 21, 1884.

Original No. 300,253, dated June 10, 1884. Application for reissue filed August 2, 1884.

*To all whom it may concern:*

Be it known that I, EDGAR W. HAZAZER, of New York, in the county of New York and State of New York, have invented a new and useful Improvement in Electric Bells, of which the following is a specification.

This invention relates to electro-vibrating call or signal bells; and has for its object such improvements on the devices of this character heretofore in use as shall render them more compact and more conveniently attachable to walls or elsewhere, more certain in operation, and less likely to get out of adjustment; shall more efficiently protect the operating parts from insects, dust, and other foreign substances, and shall secure good and permanent electrical connections throughout the parts of the apparatus in circuit.

Heretofore the works or operating parts of the bell have usually been attached to a base-plate, which is secured to the wall, and a removable box placed over the works and secured to said plate; or a box with a closed back and removable front has been sometimes used. I simplify these arrangements by employing a case inclosing and carrying the works, having an open back and closed front, and provided with means for attaching it directly to the wall. The cores of the operating electro-magnet are attached to the interior of this inclosing-box, which is of metal, and thus forms the yoke or back piece of the magnet. The non-magnetic bar, preferably of brass, which is placed between the poles of the magnet and the vibrating armature, I place directly upon the ends of the magnet-cores, thus doing away with the necessity of a central piece between the magnet-cores for holding such brass piece. The ends of the cores do not, however, project entirely through the non-magnetic piece, and consequently there is no danger of the vibrating armature ever sticking to the poles. The flat spring which carries the vibrating armature is attached directly to this brass piece, instead of to a separate support, and these parts being thus permanently attached together they can never get out of line with each other, but will always retain the same relative positions. The spring is extended so as to form the circuit-breaker, making and breaking contacts as the armature vibrates with the end of a contact-screw which extends through the side of the box, (being insulated therefrom,) its head projecting outside the box, so that it can be adjusted to the desired point. The screw is held at such point by a split bushing, which surrounds it and exerts such a pressure upon it as to hold it where it is placed, a clamping-nut being placed on the inner end of the bushing, and said bushing having an enlarged head without the box, so that it is held in position. The necessity for a cross set-screw is thus avoided. In bells of this kind dust, insects, &c., are apt to penetrate to the interior of the box through the aperture in which the bell-hammer arm moves back and forth. To obviate this I attach a plate to such arm outside the hole, which plate moves with said arm, and is of such size as to cover the hole during all the movements of said arm. The circuit through the box is from an insulated binding-post around the magnet-coils to the contact-screw, thence to the vibrating armature, the brass piece, the magnet-cores, and the box, to a binding-screw uninsulated from said box. It will be seen that all the connections are solid ones, there being no loose joints in which oxidation would be likely to occur.

Figure 2:
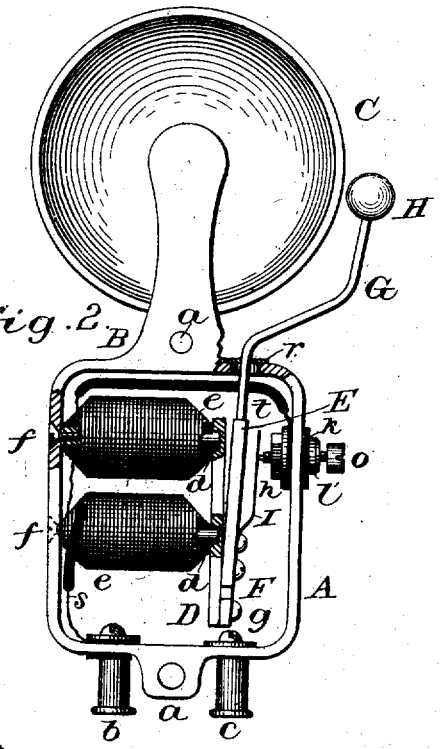
Figure 4:
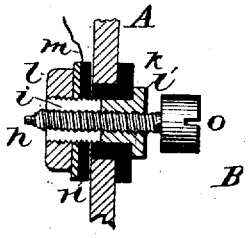
Figure 5:
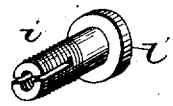
Figure 3:
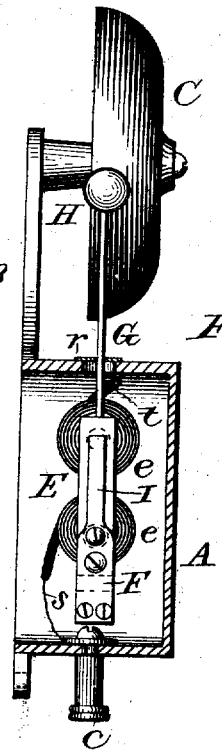

My invention is illustrated in the annexed drawings, in which Figure 1 is a front elevation of the apparatus embodying said invention; Fig. 2, a rear elevation of the same, with portions of the box in section; Fig. 3, a section of the box and side view of the works; Fig. 4, a section of that part of the box through which the contact-screw passes, and Fig. 5 a view of the split bushing which surrounds said screw.

A is a box, cast, preferably, in one piece, of iron, with closed front and open back, from which projects an arm, B, cast in one piece with the box, which carries the gong C. The box is attached directly to the wall or other suitable backing by means of the screw-holes *a a*, the wall closing tightly the open back of the box. The box is provided with an insulated binding-post, *b*, and an uninsulated one, *c*. The cores *d d* of the operating electro-magnet, wound with coils *e e*, are attached to the box A by screws *f f*. Upon the opposite ends of the cores the brass plate D is forced. The cores do not project entirely through the plate, and hence the armature E can never touch and stick to the magnet-poles. The apertures in the brass plate into which the cores are forced may be bored entirely through the plate or not, as desired. The armature E is carried by the flat spring F, which is attached to the projecting heel *g* at the lower end of plate D. From the armature E the arm G extends, terminating in the hammer H, which strikes upon the gong C when the armature is attracted. The flat spring F extends upwardly, forming the contact-spring I, which forms one side of the circuit-breaker. The other side is the point of the screw *h*. This screw extends through the side of the box A, surrounded by the split bushing *i*, which is separated from the metal of the box by the insulating-thimble *k*, and from the clamping-nut *l* and metallic washer *m* by the insulating-disk *n*. The split bushing *i* and nut *l* exert such a pressure upon the screw *h* as to hold it in the position to which it is adjusted by turning its head *o*. The split bushing has an enlarged head, *l'*, which, together with the nut *l*, prevents the bushing from movement in either direction. The vibrating arm G passes through an aperture in the top of the box, as shown, and encircling said arm is the disk or plate *r*, which continually covers said aperture and prevents the admission to the box of any foreign substances. The circuit through the box is, as stated, completed without any loose and oxidizable joints, and is as follows: from binding-post *b*, through wire *s*, to coils *e e*; thence by wire *t* to contact-screw *h* and spring I, and thence through armature E, plate D, and magnet-cores *d d* to the box A and binding-post *c*.

I am aware of the patent to Edwards and Lüngen, No. 240,582.

What I claim is—

1. In electric-bell apparatus, the combination, with the works, of a case inclosing and carrying the same, and having an open back and closed face, substantially as set forth.

2. The metallic box cast in one piece, with open back and closed face, for carrying and inclosing the works of an electric bell, substantially as set forth.

3. The combination of the iron inclosing-box and the magnet-cores attached directly thereto, said box alone forming the yoke or back piece of the magnet, substantially as set forth.

4. The combination, with the magnet-cores and the vibrating armature, of the non-magnetic bar supported by such cores, substantially as set forth.

5. The combination of the magnet-cores and the non-magnetic bar placed upon them, said cores not projecting entirely through said bar, substantially as set forth.

6. The combination, with the electro-magnet and the non-magnetic bar placed before it, of the vibrating armature carried by said bar, substantially as set forth.

7. The combination, with the electro-magnet and the non-magnetic bar placed before it, of the flat spring attached to said bar and carrying the vibrating armature, substantially as set forth.

8. The combination of the metallic inclosing-box, the magnet-cores, the non-magnetic bar placed upon said cores, and the vibrating armature attached to said bar, substantially as set forth.

9. The combination of the cores, the non-magnetic bar attached thereto, the vibrating armature carried by said bar, and the contact-spring attached to said armature, substantially as set forth.

10. The combination, with an adjustable contact-screw passing through the side of a box, of a split bushing surrounding said screw and having an enlarged head outside of the box, and a clamping-nut upon said split bushing within the box, substantially as set forth.

11. In electric-bell mechanism, the combination, with a contact-screw adjustable through the side of the inclosing-box to and from a contact-spring carried by the vibrating armature, of a split bushing surrounding said screw and having an enlarged head, and a clamping-nut upon said split bushing, substantially as set forth.

12. The combination, with an adjustable contact-screw passing through the side of an iron inclosing-box, of a split bushing surrounding said screw and having an enlarged head, a clamping-nut on the other end of said split bushing, and insulating material surrounding said bushing and clamped between the enlarged end and the clamping-nut, substantially as set forth.

13. The combination, with the inclosing-box and the bell-arm passing through an aperture in said box and vibrating in said aperture transversely thereto, of means for keeping such aperture closed constantly against the admission of dust, &c., substantially as set forth.

14. The combination, with the arm carrying the bell-hammer, of the plate carried thereby and covering the aperture through which said arm passes, substantially as set forth.

15. In electric-bell mechanism, the combination of the iron inclosing-box and the magnet-cores attached directly thereto, both the box and cores forming parts of the circuit through the mechanism, substantially as set forth.

16. In electric-bell mechanism, the circuit including the magnet-coils, the fixed contact-point, the vibrating armature, the non-magnetic bar, to which said armature is attached, the magnet-cores, and the inclosing-box, substantially as set forth.

EDGAR W. HAZAZER.

Witnesses:
H. W. SEELY,
T. G. GREENE, Jr.